(12) United States Patent
Tourdot et al.

(10) Patent No.: US 8,960,455 B2
(45) Date of Patent: Feb. 24, 2015

(54) MOBILE INDUSTRIAL RACK SYSTEM

(71) Applicant: Spacesaver Corporation, Fort Atkinson, WI (US)

(72) Inventors: Matthew A. Tourdot, Whitewater, WI (US); James C. Muth, Oconomowoc, WI (US); Brian R. Nemec, Delavan, WI (US); Brian P. Bourke, Jefferson, WI (US); Eric J. Wipperfurth, Fort Atkinson, WI (US)

(73) Assignee: Spacesaver Corporation, Fort Atkinson, WI (US)

( * ) Notice: Subject to any disclaimer, the term of this patent is extended or adjusted under 35 U.S.C. 154(b) by 0 days.

(21) Appl. No.: 13/848,101

(22) Filed: Mar. 21, 2013

(65) Prior Publication Data

US 2013/0248474 A1 Sep. 26, 2013

Related U.S. Application Data

(63) Continuation of application No. 12/678,830, filed as application No. PCT/US2007/078725 on Sep. 18, 2007, now Pat. No. 8,443,990.

(51) Int. Cl.
*A47F 7/00* (2006.01)
*A47B 53/02* (2006.01)
*B65G 1/10* (2006.01)

(52) U.S. Cl.
CPC .. *A47B 53/02* (2013.01); *B65G 1/10* (2013.01)
USPC .......... 211/85.8; 211/1.57; 211/162; 312/201

(58) Field of Classification Search
CPC ..... B65D 88/12; B65D 88/121; A47F 5/0093

USPC ............... 280/32.7, 304.1, 418.1, 423.1, 204,
280/209, 492–494; 180/65.1; 211/1.57,
211/85.8, 162; 312/198, 199; 414/277, 281,
414/331.11
See application file for complete search history.

(56) References Cited

U.S. PATENT DOCUMENTS

| | | | | | |
|---|---|---|---|---|---|
| 3,485,314 | A | * | 12/1969 | Herr | 180/19.1 |
| 3,575,250 | A | * | 4/1971 | Dykes | 180/11 |
| 3,801,176 | A | * | 4/1974 | Higbee | 312/199 |
| 4,096,920 | A | * | 6/1978 | Heyn | 180/11 |
| 4,153,312 | A |  | 5/1979 | Taniwaki | |
| 4,600,209 | A | * | 7/1986 | Kerr, Jr. | 280/400 |
| 5,172,927 | A | * | 12/1992 | Bobb et al. | 280/304.1 |
| 5,918,892 | A | * | 7/1999 | Aaron et al. | 280/47.38 |
| 6,273,444 | B1 | * | 8/2001 | Power | 280/304.1 |
| 2003/0137273 | A1 | * | 7/2003 | Davidov | 318/685 |
| 2004/0216957 | A1 |  | 11/2004 | Hansl et al. | |
| 2006/0215300 | A1 |  | 9/2006 | Starr et al. | |

OTHER PUBLICATIONS

PCT Search Report dated Apr. 11, 2008.

* cited by examiner

*Primary Examiner* — Korie H Chan
(74) *Attorney, Agent, or Firm* — Andrus Intellectual Property Law, LLP (57) ABSTRACT

A mobile industrial rack system which includes a flue spacer, a carriage spacer, and a synchronous motor control that individually and collectively allows the rack system to be used on unleveled surfaces. The industrial rack system is therefore well suited for storage facilities in which it is not possible or not desired to level an otherwise unleveled floor.

10 Claims, 12 Drawing Sheets

MOBILE INDUSTRIAL RACK SYSTEM

CROSS-REFERENCE TO RELATED APPLICATION

The present application is a continuation of U.S. patent application Ser. No. 12/678,830, filed on Apr. 30, 2010, which is the U.S. National Phase of PCT/US2007/078725, filed on Sep. 18, 2007, priority to which is claimed and the subject matter of which is incorporated herein by reference.

BACKGROUND OF THE INVENTION

The present invention relates generally to industrial storage systems and, more particularly, to a mobile industrial rack system for use on unleveled flooring.

Industrial rack systems are commonly used in storage facilities to store products until those products are shipped either directly to a consumer or to a retailer. Typically, the industrial racks store loaded pallets that are placed on and removed from the racks using a forklift. The industrial racks are spaced from one another in a manner to form relatively wide aisles to allow sufficient room for the forklift to load and remove the pallets. Since each industrial rack has a fixed position, each industrial rack must have a dedicated aisle. Moreover, since each aisle is typically as wide, if not wider than, the rack itself, more than half the floor space occupied by the industrial rack system may be occupied by aisles and thus not usable for product storage.

Mobile industrial rack systems, however, are designed to reduce the number of fixed aisles and, as a result, increase the amount of floor space used for product storage. More particularly, in a typical configuration, a single aisle may be allocated for the entire industrial rack system. The position of that single aisle can be changed by moving the industrial racks along a track or rail that is mounted or otherwise secured to the storage facility flooring, which is typically a concrete slab. While in some configurations each industrial rack is moved independently, it is common for back-to-back industrial racks to be coupled using a rigid flue spacer connector and moved as a single unit by a single mobile carriage supporting both racks. To access a forward rack of a given back-to-back configuration, the racks are moved such that an aisle is formed immediately forward of the back-to-back configuration. To access a rearward rack of the given back-to-back configuration, the racks are moved such that an aisle is formed immediately rearward of the back-to-back configuration. Mobile industrial rack systems provide nearly twice the storage capacity of a similarly sized fixed rack system.

Conventional mobile industrial rack systems must be mounted on a level floor such that the heavy loading of the industrial racks does not create an undesired imbalance as the racks are being moved. Thus, in a typical implementation, the existing concrete floor of a storage facility, which is generally not level within the specifications required for the mobile industrial rack system, must be leveled by applying a thin coat of concrete material to the concrete floor. The rails along which the racks move are then anchored through the thin coat of concrete material and to the concrete floor. Alternately, footings may be anchored to the concrete floor and the rails anchored through the footings to the concrete floor. When footings are used, grout or similar material is typically placed between the rails and the concrete floor. In both instances, measures must be taken to provide a level surface for the rails along which the racks move, which are generally quite costly.

BRIEF DESCRIPTION OF THE INVENTION

The present invention is directed to a mobile industrial rack system usable on unleveled flooring surfaces. The mobile rack system includes a flue spacer connector having a play feature that allows the industrial racks arranged in a back-to-back configuration to move relative to one another when the back-to-back configuration is being moved across an unleveled floor surface.

The present invention is also directed to a mobile industrial rack system in which industrial racks of a back-to-back configuration are independently supported by a respective carriage. The pair of carriages is coupled to another by a carriage spacer that allows the carriages to move independently of one another while maintaining a union of the two carriages.

The present invention is also directed to a mobile industrial rack in which an industrial rack is translated by a series of carriages each having a motor driven roller. An encoder is associated with each motor and provides feedback to a synchronous motor control that adjusts the speed by which each motor drives its respective roller. In this regard, the motors are controlled independently, but are synchronized such that each motor drives its roller at approximately the same speed.

Therefore, in accordance with one aspect of the invention, a mobile industrial rack system includes a first industrial rack and a second industrial rack. A mobile carriage is adapted to ride along a rail and support the first industrial rack and the second industrial rack. A flue spacer interconnects the first industrial rack and the second industrial rack and allows the first industrial rack and the second industrial rack to move relative to another when the mobile carriage translates along the rail.

In accordance with another aspect of the invention, a mobile industrial rack system includes a rail adapted to be mounted to a concrete slab, a first industrial rack adapted to support a load such as a plurality of pallets, and a second industrial rack adapted to support a load such as a plurality of pallets. A flue spacer interconnects the first industrial rack and the second industrial rack to form a back-to-back configuration. A first mobile carriage is adapted to ride along the rail and support the first industrial rack, and a second mobile carriage is adapted to ride along the rail and support the second industrial rack. A carriage spacer interconnects the first mobile carriage and the second mobile carriage and is adapted to allow the first and second carriages to move independently of one another when the racks are translated together along the rail.

According to another aspect of the invention, a mobile industrial rack system includes a series of rails arranged parallel to and spaced from one another along a concrete slab. An industrial rack is designed to be translated along the rails by first and second motors. A synchronous motor control is communicatively linked with the first and second motors to synchronize operation of the first and second motors.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings illustrate the best mode presently contemplated for carrying out the invention. In the drawings.

DETAILED DESCRIPTION OF THE INVENTION

Figure 1:
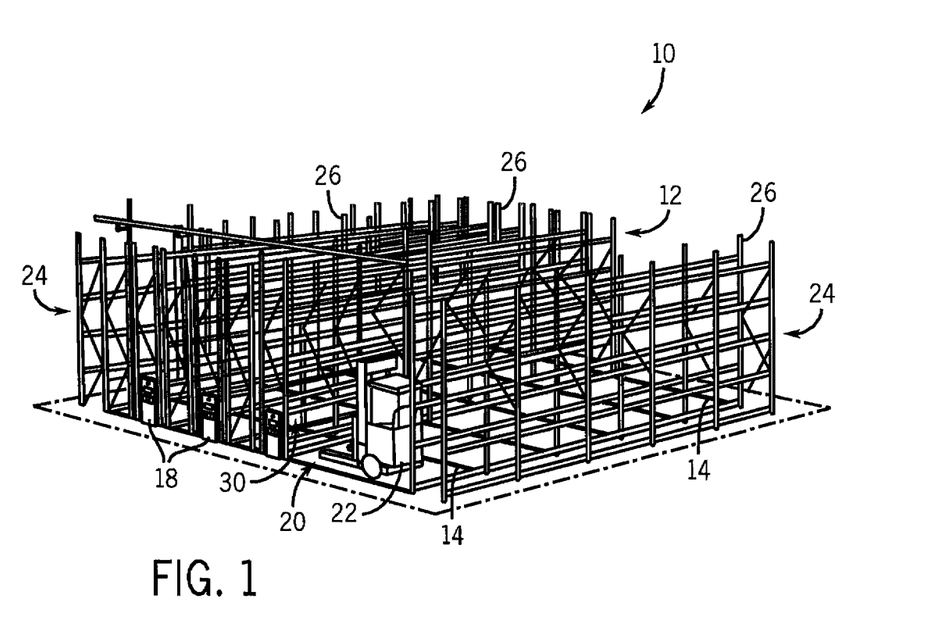
FIG. 1 is an isometric view of a representative embodiment of a mobile industrial rack system incorporating the features of the present invention.
Figure 1A:
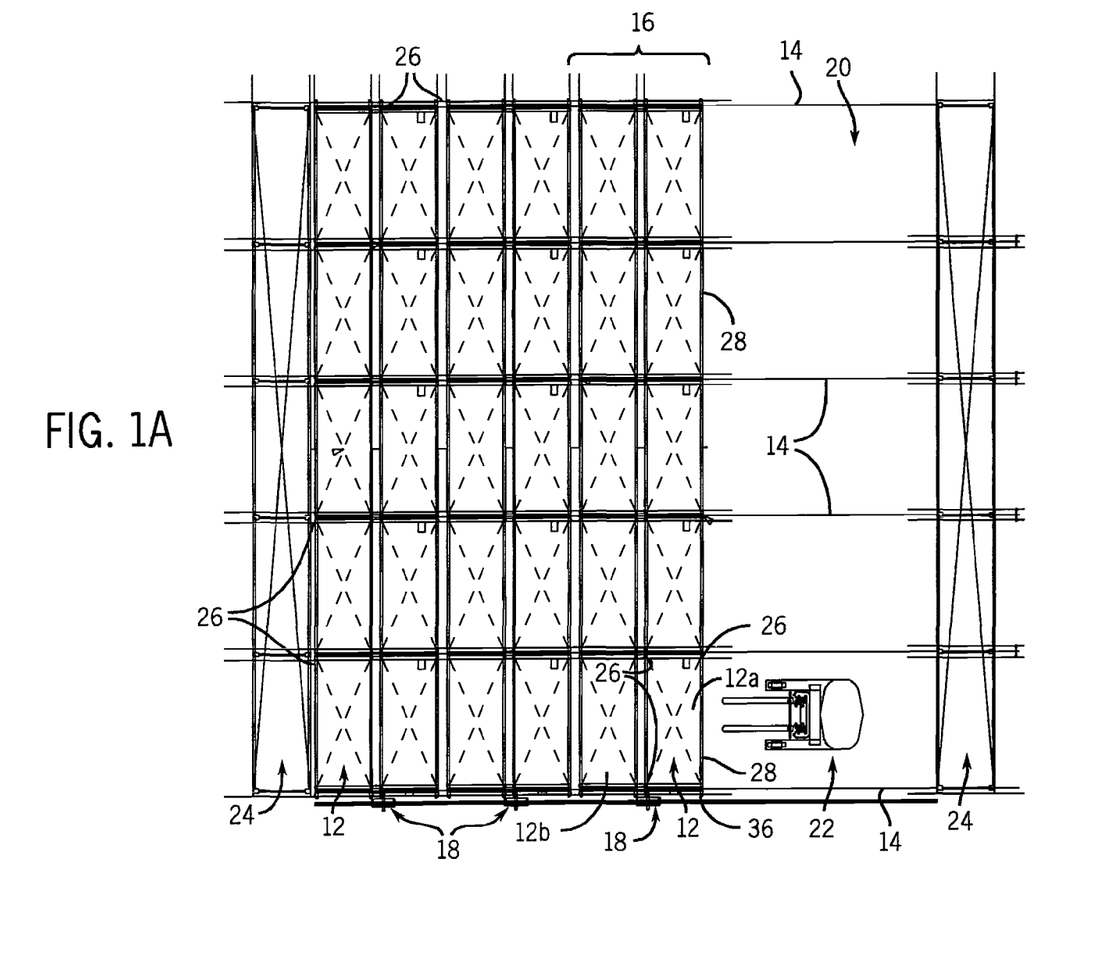
FIG. 1A is top schematic plan view of the mobile industrial rack system of FIG. 1.

Referring now to FIGS. 1 and 1A, a mobile industrial rack system 10 is comprised of a series of industrial racks 12 that are movable along a series of spaced and parallel rails 14. The industrial racks 12 are arranged in pairs so as to form multiple back-to-back configurations 16, with each back-to-back configuration 16 having a forward rack 12a and a rearward rack 12b, and being movable as a single unit. Each back-to-back configuration 16 is associated with a control interface 18 that controls movement of the industrial racks 12 along the rails 14. Either through an input directly to the control interface 18 or using suitable remote controls, the back-to-back configurations 16 can be translated along the rails 14 to move the location of an aisle 20 between adjacent back-to-back configurations 16, based on the industrial rack 12 that is to be accessed. In a preferred embodiment, the racks 12 are moved such that aisle 20 is sufficiently wide to accommodate a forklift 22. One skilled in the art will appreciate that if the forward rack 12a of a back-to-back configuration 16 is to be accessed, the industrial racks 12 are moved such that aisle 20 is formed immediately forward of the forward rack 12a. On the other hand, if the rearward rack 12b of the back-to-back configuration 16 is to be accessed, the industrial racks 12 are moved such that aisle 20 is formed immediately rearward of the rearward rack 12b.

Additionally, in a preferred embodiment, the mobile industrial rack system 10 may include a pair of stationary industrial racks 24 that bookend the movable industrial racks 12, as shown in FIG. 1A. The stationary industrial racks 24 are aligned with rails 14 but do not translate along the rails 14. One skilled in the art will appreciate that stationary industrial racks 24 may be mounted proximate a wall (not shown) such that access to the racks 24 is available only if an aisle 20 is formed between a stationary rack 24 and a movable rack 12 or, alternately, each stationary rack 24 may be positioned such that an aisle (not shown) is formed between the stationary rack 24 and the wall.

Each industrial rack 12, 24 is comprised of vertical posts 26 of generally equal height connected to one another by a series of bars 28. In a preferred implementation, each industrial rack 12, 24 will include multiple sets of bars 28 that are connected to the vertical posts 26 such that multiple storage bays 30 are defined for each industrial rack 12, 24. In a preferred embodiment, each storage bay 30 is adapted to support a load such as at least one pallet (not shown).

Figure 2:
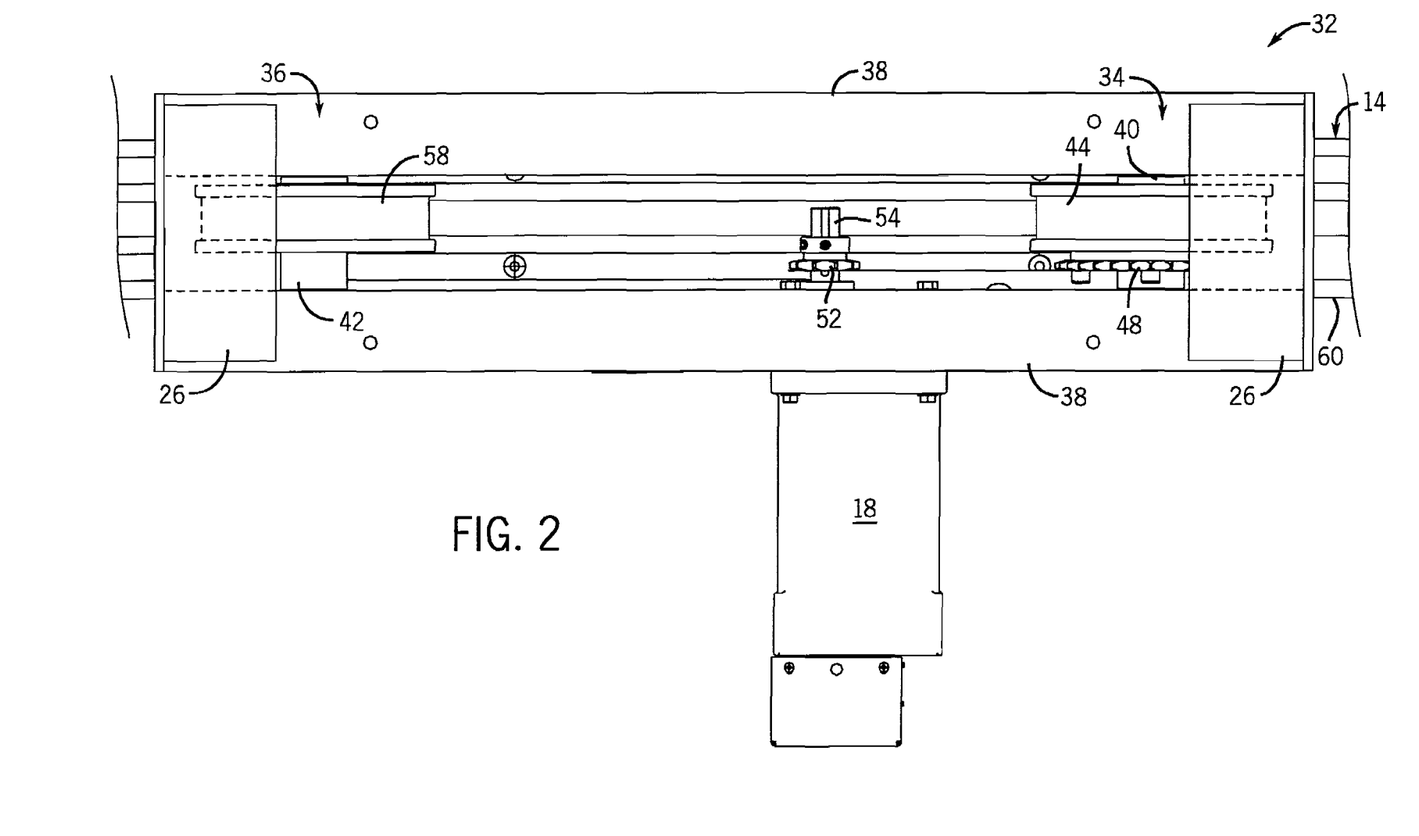
FIG. 2 is a top plan view of a carriage incorporated into the mobile industrial rack system of FIG. 1.

Referring now to FIG. 2, each movable industrial rack 12 is translated along rail 14 by a carriage that includes a series of carriage drive units 32, each of which includes a drive roller 34 and a driven roller 36. Each carriage drive unit 32 further includes a pair of support members 38 of length generally equal to the depth of the industrial rack that it supports. The support members 38 couple to two vertical posts 26 using a suitable connection. In addition to being joined indirectly through the coupling of the vertical posts 26, the support members are interconnected by a drive roller axle 40 and a driven roller axle 42. In a manner as is known, the carriage drive units 32 are secured together by a suitable frame structure the supports the industrial racks 12.

Figure 3:
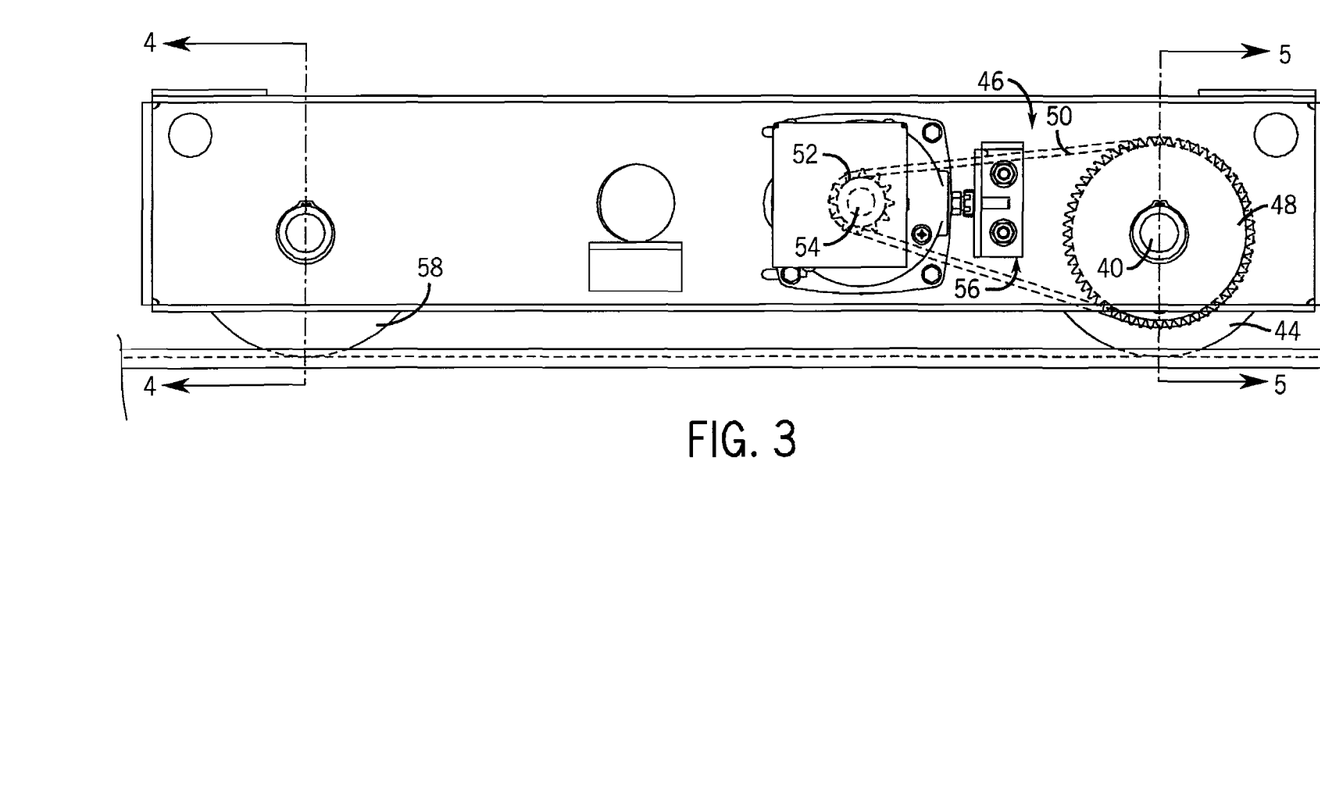
FIG. 3 is a side elevation view of the carriage shown in FIG. 2.

As further shown in FIG. 3, the drive roller 34 includes a drive wheel 44 that is caused to rotate about axle 40 by a belt and gear assembly 46. The belt and gear assembly 46 includes a gear 48 centered about axle 40 and designed to rotate in either a clockwise or counterclockwise direction based on the translational direction of belt 50. Alternately, belt 50 may be a chain. The belt 50 is trained about gear 48 and a drive gear 52 that is centered about drive shaft 54. When drive shaft 54 is caused to rotate, the drive gear 52 also rotates and translates belt 50 about its trained path thereby causing drive wheel 44 to rotate and thus travel along rail 14. The drive shaft 54 is caused to rotate by a motor assembly 56.

Referring back to FIG. 2, the driven roller 36 includes a driven wheel 58 that, in a preferred embodiment, is not forcibly driven like drive wheel 44 of the drive roller. In this regard, driven wheel 58 is not directly caused to rotate, but will only rotate when the carriage drive unit 32 as a whole is caused to move by rotation of drive wheel 44.

Referring now to FIGS. 2 and 4-6, rail 14 includes a base plate 60 that, in a preferred embodiment, is anchored to the floor 62 using suitable anchors 64, such as concrete screws. In this embodiment, the rail 14 is surface mounted to the floor 62; although it is contemplated that rail 14 could be recessed mounted. In a preferred embodiment, the upper surface of the base plate 60 is shaped to define a pair of end sections 66 and a center section 68. A pair of channels 70 are defined between end sections 66 and the center section 68. The channels 70 are designed to mirror the tread pattern of wheels 44, 58. More particularly, each wheel 44, 58 has a tread pattern 72, 74, respectively, defined by a centered recess 76, 78, respectively, formed between a pair of flanges 80, 82, respectively. The flanges 80, 82 are designed to ride along the channel 70 and the centered recesses 76, 78 are designed to ride along the center section 68 of rail 14.

Figure 4:
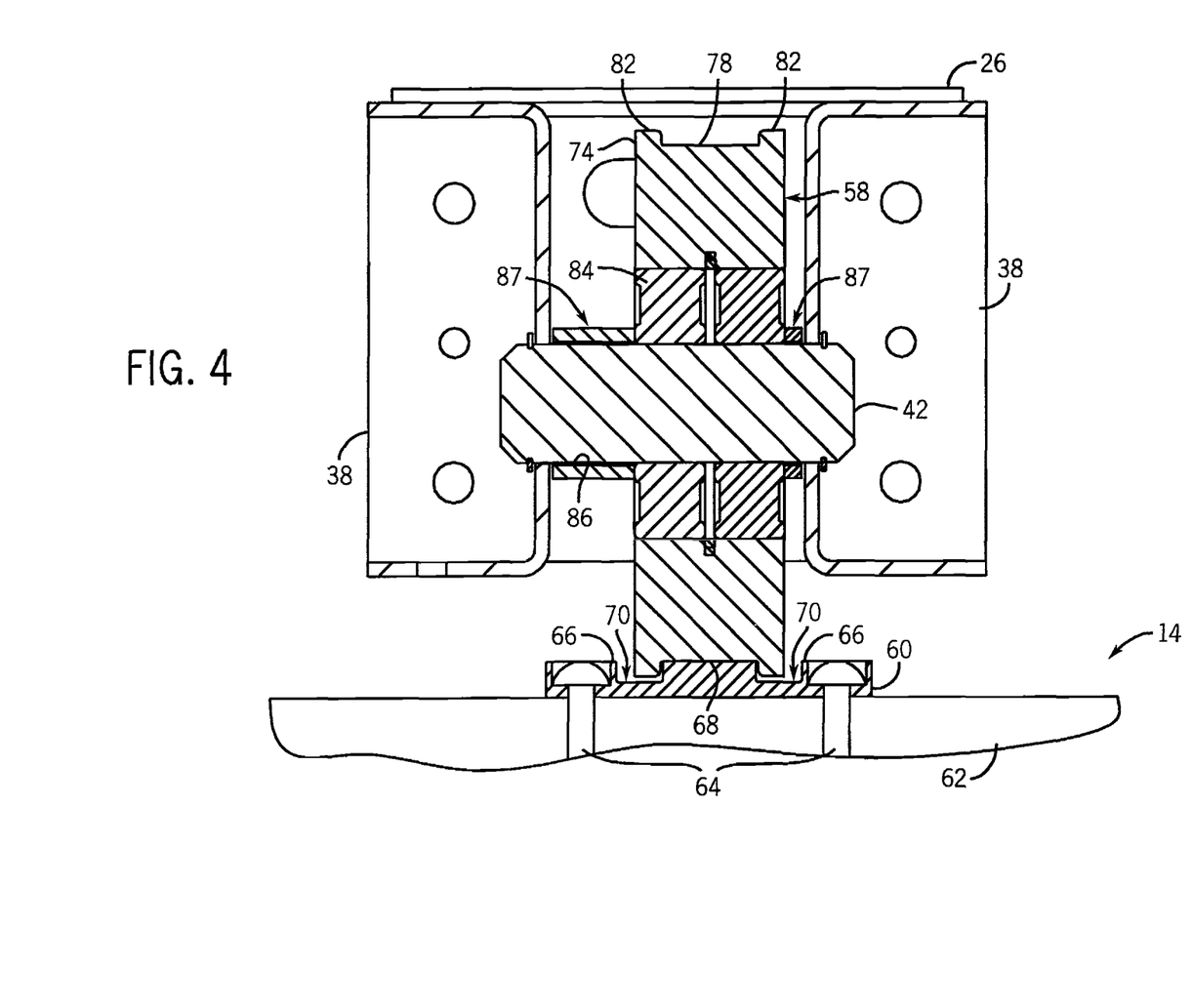
FIG. 4 is a section view of the carriage taken along line 4-4 of FIG. 2.
Figure 5:
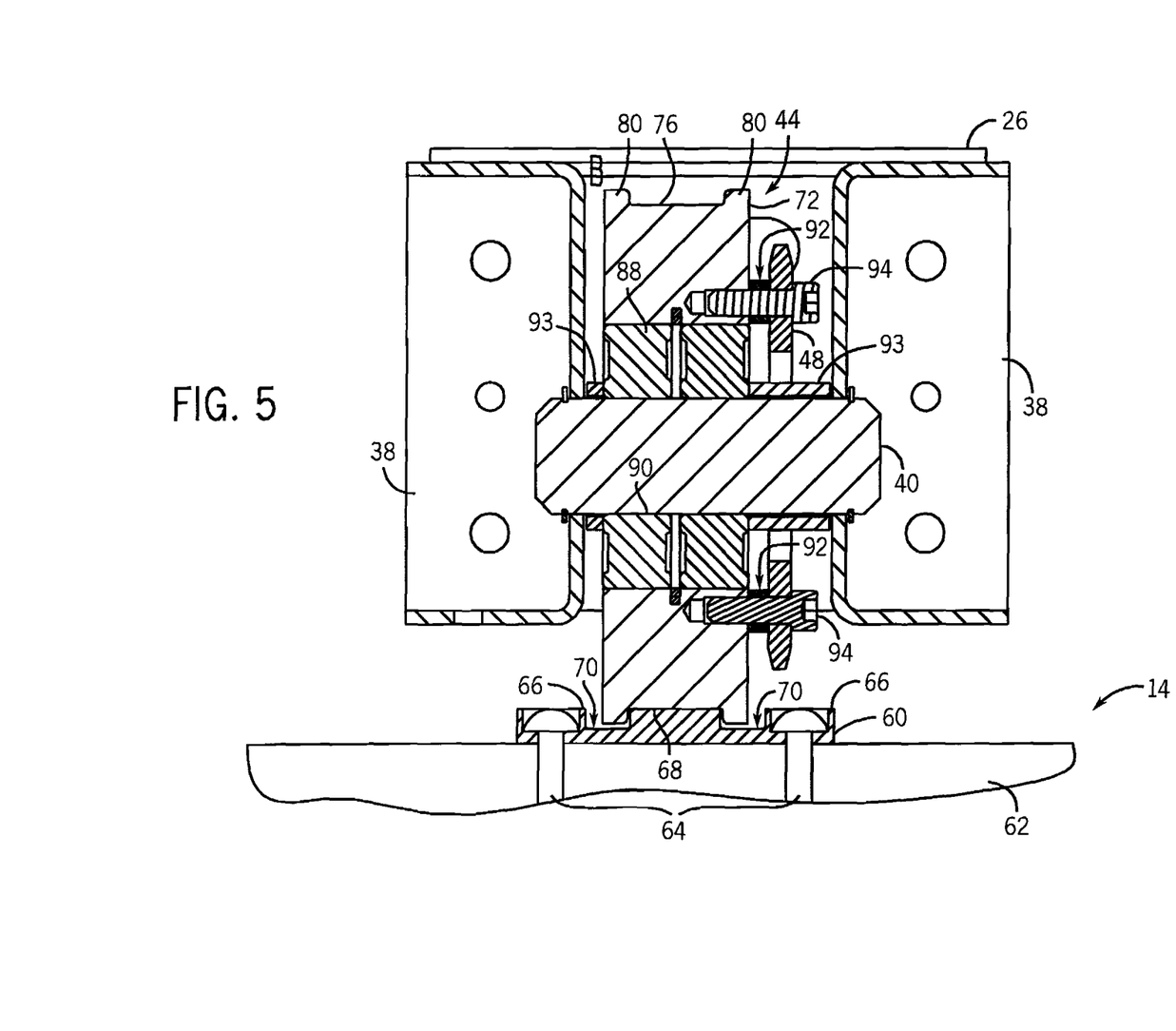
FIG. 5 is a section view of the carriage taken along line 5-5 of FIG. 2.
Figure 6:
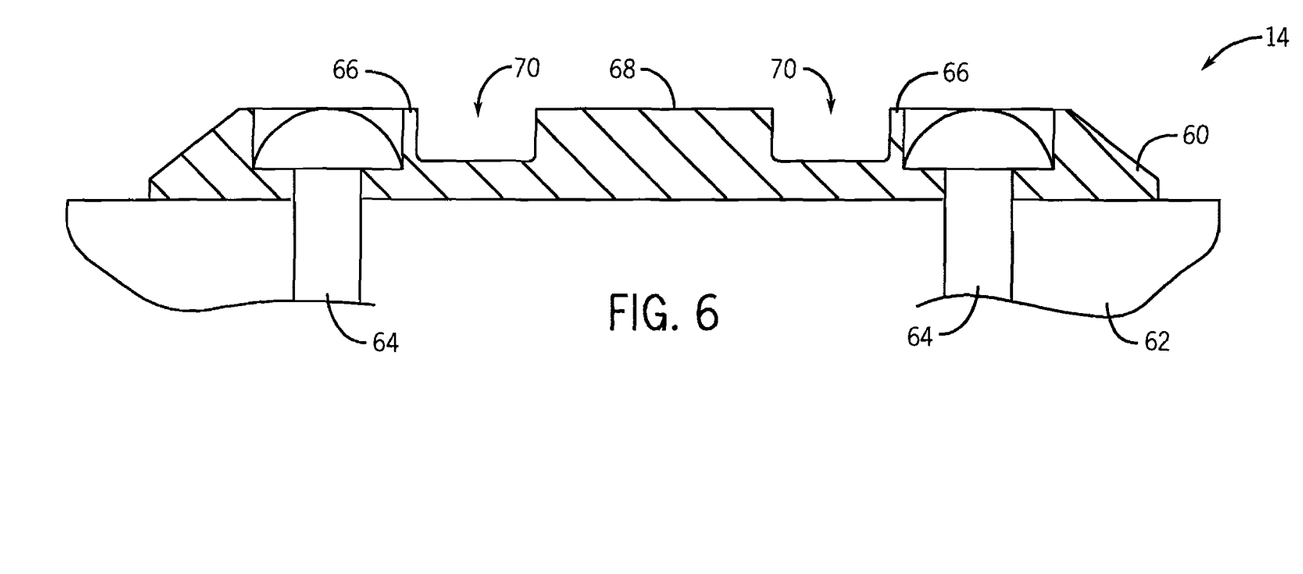
FIG. 6 is an end view of a surface mounted rail incorporated into the mobile industrial rack system of FIG. 1.

As further shown in FIG. 4, the driven wheel 58 is coupled in a known way to a hub 84 defining a central bore 86 through which axle 42 extends between the pair of support members 38. Axle spacers 87 position the driven wheel 58 between the pair of support members 38. As further shown in FIG. 5, the drive wheel 44 also has a hub 88 defining a central bore 90 through which axle 40 extends between support members 38. Gear 48 is supported by a gear plate 92 that is mounted to an exterior surface of drive wheel 44 and is designed to rotate around axle 40. Axle spacers 93 position the drive wheel 44 between support members 38. Gear 48 further includes a pair of pins 94 that interconnect the gear 48 and the drive wheel 44. The interconnection couples the gear 48 and the drive wheel to one another so that rotation of the gear 48 by belt 50 causes rotation of the drive wheel 44.

Figure 7:
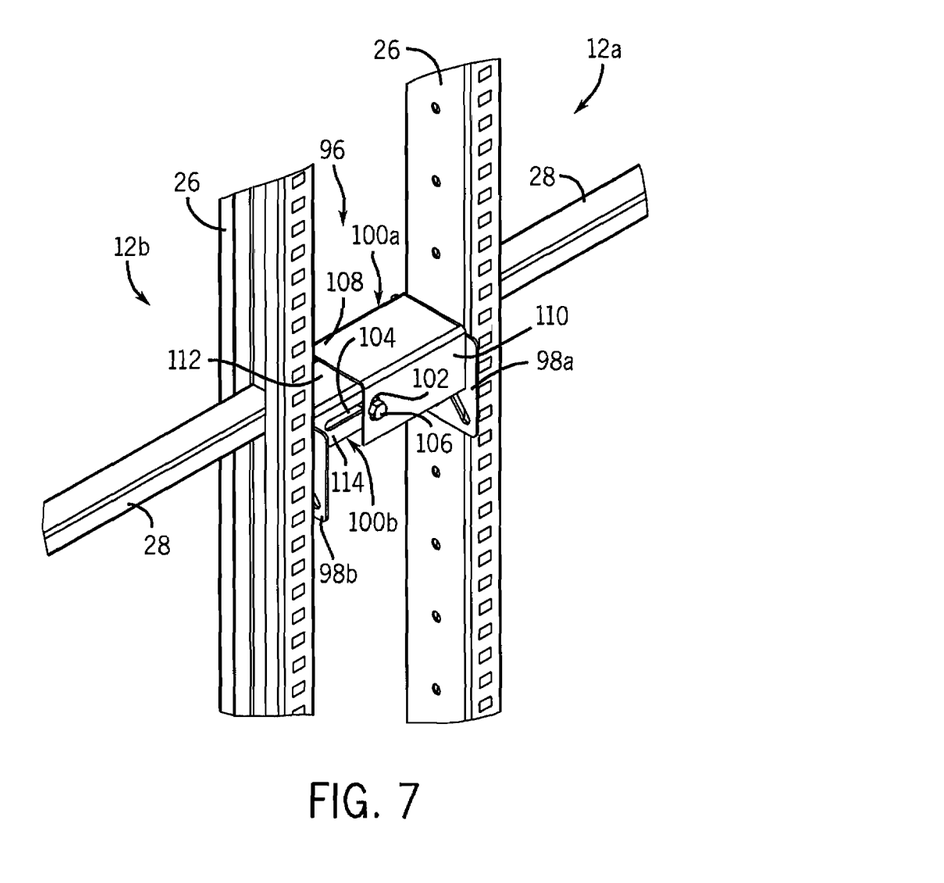
FIG. 7 is an isometric view of a flue spacer incorporated into the mobile industrial rack system of FIG. 1.
Figure 8:
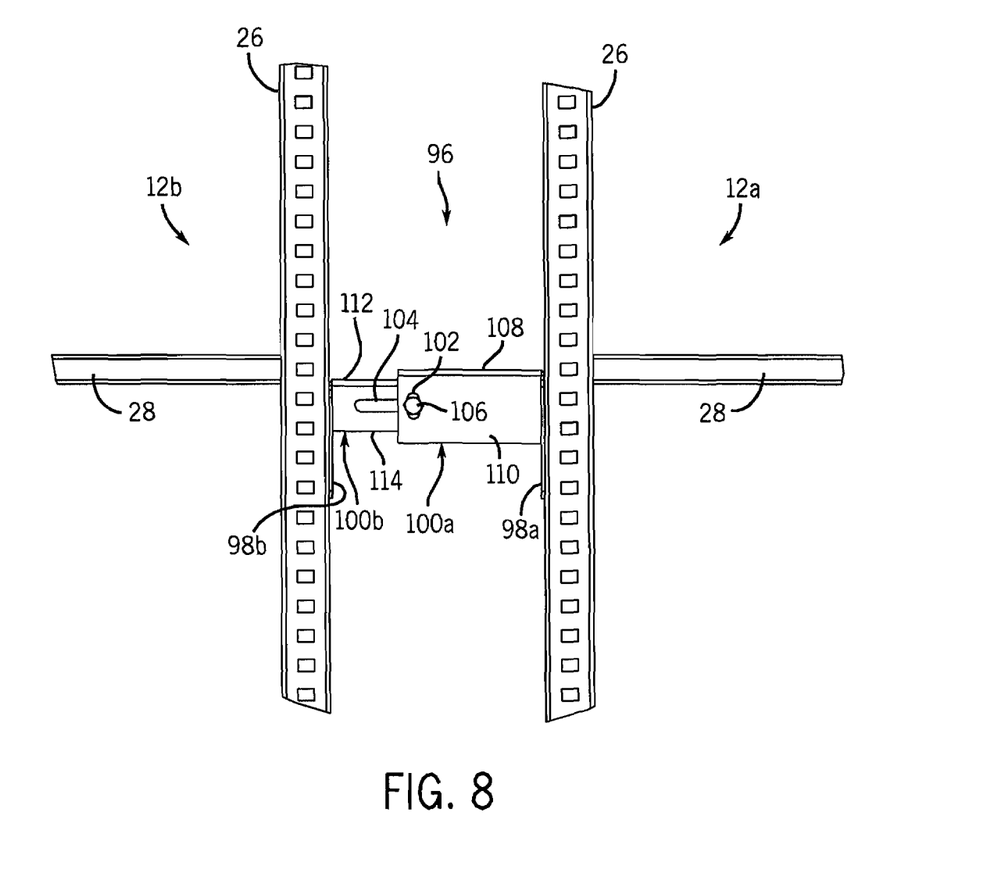
FIG. 8 is a side elevation view of the flue spacer shown in FIG. 7.

Referring now to FIGS. 7-8, a flue spacer 96 according to one aspect of the invention is shown interconnecting the forward rack 12*a* and the rearward rack 12*b* of a back-to-back configuration 16. The flue spacer 96 includes a forward mounting plate 98*a* and a rearward mounting plate 98*b*. The forward mounting plate 98*a* is coupled to a vertical post 26 of the forward rack 12*a* and the rearward mounting plate 98*b* is coupled to a vertical post 26 of the rearward rack 12*b* using suitable connectors (not shown), such as bolts. Each mounting plate 98*a*, 98*b* carries an extension member 100*a*, 100*b*, respectively, that is sized such that extension member 100*a* at least partially shrouds extension member 100*b*. In this regard, extension member 100*a* is designed to slide within extension member 100*b*.

Extension member 100*a* has a vertical slot 102 whereas extension member 100*b* has a horizontal slot 104. When the extension members 100*a*, 100*b* are properly aligned, a portion of the vertical slot 102 is aligned with horizontal slot 104 such that bolt 106 may extend through the vertical slot 102 and the horizontal slot 104 along an axis that is transverse to both the vertical slot 102 and the horizontal slot 104.

More particularly, extension member 100*a* includes a top plate 108 and a pair of downwardly extending side plates 110; only one of which is visible in the figures. The vertical slot 102 is formed in one of the side plates 100 whereas a second vertical slot (not shown) aligned with vertical slot 102 is formed in the other of the side plates. Extension member 100*b* also includes a top plate 112 and a pair of downwardly extending side plates 114, with each side plate 114 having a horizontal slot 104 formed therein. Bolt 106 has a length sufficient to extend through the horizontal slot 104 of each side plate 114.

In operation, the flue spacer 96 is designed to allow relative movement of the industrial racks 12*a*, 12*b* when the industrial racks 12*a*, 12*b* are moved along an uneven surface. Specifically, as the forward rack 12*a* is moved in the forward direction and encounters an area of rail 14 that is on a non-level portion of the underlying floor, the forward rack 12*a* will experience an angular displacement relative to the rearward rack 12*b*. The flue spacer 96 allows the forward rack 12*a* to play in two different directions relative to the rearward rack 12*b* as a result of the change in floor incline. More particularly, the vertical slot 102 allows the forward rack 12*a* to ride upward relative to the rearward rack 12*b* as a result of the change in floor incline. Thus, extension member 100*a* will move upward relative to bolt 106.

Additionally, the flue spacer 96 will permit the forward rack 12*a* to slide forward or rearward relative to the rearward rack 12*b*. More particularly, the extension member 100*a* may slide along the top plate 112 and side plates 114 of extension member 100*b* without the extensions members 100*a*, 100*b* disconnecting from one another. The bolt 106 extending through the vertical and horizontal slots 102, 104 maintains the interconnection of the extension members 100*a*, 100*b* and thus racks 12*a*, 12*b* but allows a limited displacement or play of the racks 12*a*, 12*b* relative to one another. The ends of the slots 102, 104 define the range of relative vertical and horizontal movement between the racks 12*a*, 12*b*, to accommodate a desired degree of angular displacement between the racks 12*a*, 12*b*. With this construction, the flue spacer 96 movably and adjustably interconnects the racks 12*a*, 12*b*.

Flue spacers such as 96 are provided on selected ones of posts 26 and at one or more locations along the height of the posts 26, according to the length and height of the industrial racks 12, in order to securely maintain the racks together when the racks 12 are moved together in a back-to-back configuration 16.

Figure 9:
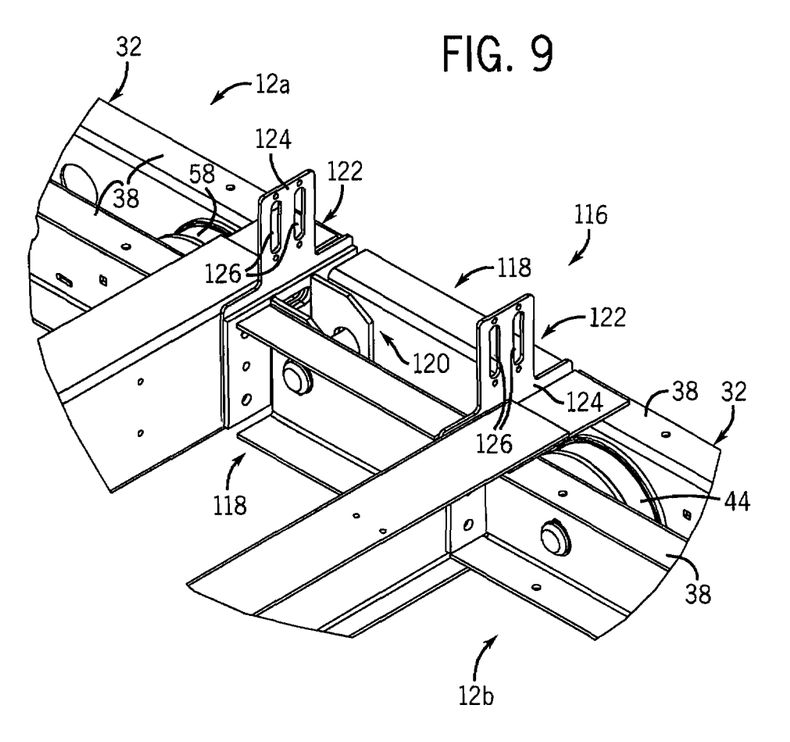
FIG. 9 is an isometric view of a carriage spacer incorporated into the mobile industrial rack system shown in FIG. 1.
Figure 9A:
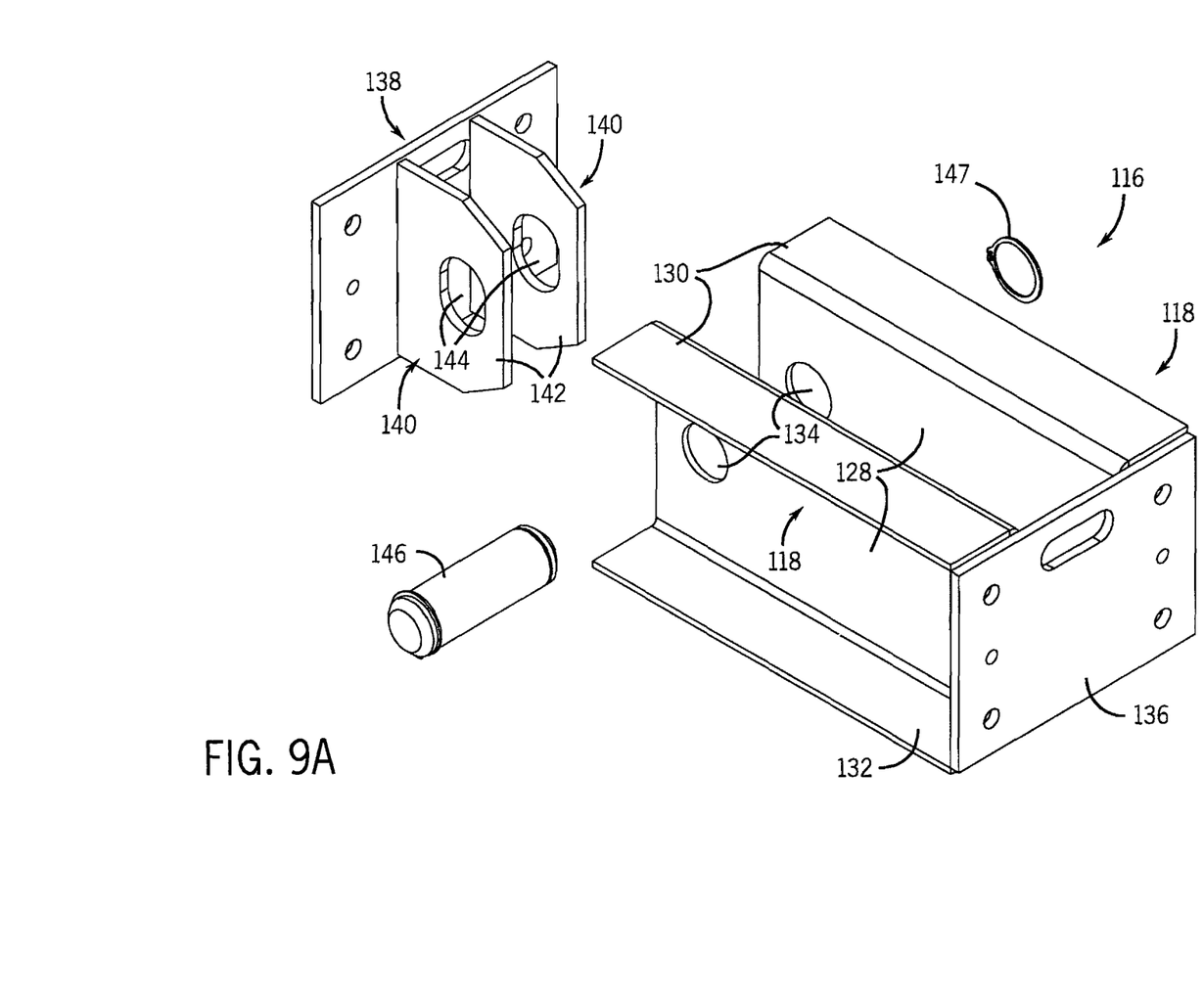
FIG. 9A is an exploded view of the carriage spacer shown in FIG. 9.

Referring now to FIGS. 9 and 9A, the racks 12*a*, 12*b* of a back-to-back configuration 16 are also joined by a carriage spacer 116 that includes a pair of braces 118 arranged parallel to another with a pin connection 120 interconnected therebetween. The carriage spacer 116 is mounted in a conventional manner to carriage drive unit 32 of the forward industrial rack 12*a* and the carriage drive unit 32 of the rearward rack 12*b*. As illustrated in FIG. 9, mounting brackets 122 are interconnected between the carriage spacer 116 and the carriage drive units 32. The mounting brackets 122 include legs 124 that are designed to mate against the lower surface of a vertical post 26 and secured to the vertical post 26 by inserting bolts not shown) through holes (not shown) formed in the vertical post 26 that are aligned with slots 126 formed in the legs 124.

Referring particularly to FIG. 9A, braces 118 are each comprised of a pair of wall members 128, a top plate 130, and a bottom plate 132. Holes 134, which are aligned with one another, extend through the pair of wall members 128. The braces 118 are both fastened in a known way to end plate 136 that is fastened to the mobile carriage drive unit 32 of the rearward rack 12*b*. The carriage spacer 116 further includes a mounting plate 138 that is fastened in a known way to the carriage drive unit 32 of the forward rack 12*a*. The mounting plate 138 has a pair of projections 140 each of which is defined by a narrow plate 142 having a hole 144 formed therethrough. When assembled, the mounting plate 138 is positioned relative to the braces 118 such that holes 134 and 144 are aligned. Pivot pin 146 is then inserted through both sets of holes 134, 144 and retained therethrough by ring 147. The pivot pin 146 provides a pivot against which the racks 12*a*, 12*b* may move relative to another when the racks 12*a*, 12*b* are being moved along rail 14.

In a preferred embodiment, holes 144 are slightly larger and more elongated than holes 134. Thus, holes 144 effectively form slots in which the pivot pin 146 may move vertically relative to the mounting plate 138 when the racks 12*a*, 12*b* are being moved in the rearward direction. Alternately, holes 144 allow the mounting plate 138 to move relative to the pivot pin 146 when the racks 12*a*, 12*b* are being moved in the forward direction. Thus, when variations in the incline of the floor are encountered, the carriage spacer 116 will maintain connection of the back-to-back lacks 12*a*, 12*b* but penult limited displacement so as to reduce the impact of the unleveled floor.

In a preferred embodiment, each back-to-back configuration 16 will have multiple carriage drive units 32 to translate the racks along rails 14. As described above, each carriage includes a drive wheel and a driven or follower wheel; although, it is contemplated that each wheel may be motor driven. Each motor driven wheel is driven independently by a dedicated motor; however, in a preferred embodiment, the operation of each motor is synchronized so that the motors for a given back-to-back configuration 16 operate at approximately the same speed.

Figure 10:
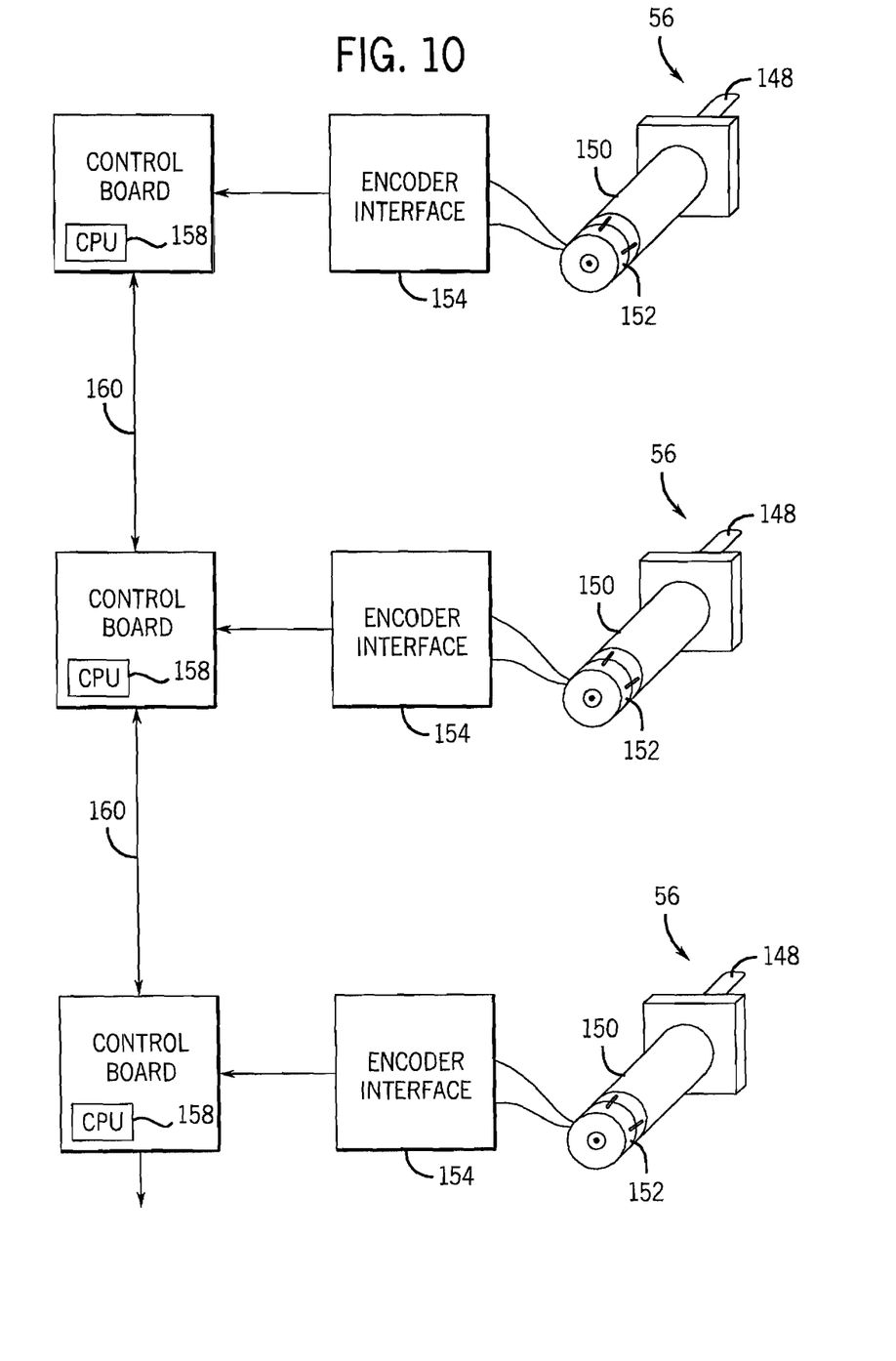
FIG. 10 is a schematic representation of a synchronous motor control incorporated into the mobile industrial rack system shown in FIG. 1.

As shown in FIG. 10, each motor assembly 56 includes a drive shaft 148 driven by a motor 150. Each motor 150 includes an encoder 152 that counts rotations of the motor 150. The encoder counts are provided to an encoder interface 154 that outputs the encoder counts to control board 156. The control board 156 associated with each motor assembly 56 includes software that causes a processor 158 to compare the encoder count value of each motor 150 and then provide command signals to the motor 150 to synchronize motor speed for all the motors 150 for a given rack 12 or back-toback configuration 16. More particularly, each processor 158 compares the encoder count for each motor and adjusts operation of its associated motor 150 such that the encoder count differential between motors approaches zero. The encoder count values are communicated between processors 158 through a high-speed link 160. Thus, while the motors 150 are controlled independently, their operation is synchronized to reduce racking of skewing during translation of the racks 12 over an unleveled surface.

While the present invention has been described with respect to industrial racks, it is understood that the invention may also be used in other mobile rack systems where it is desirable to account for, rather than replace or modify, an unleveled floor. Additionally, while the invention has been described with respect to an industrial rack system having flue spacers, carriage spacers, and a synchronous motor control, it is understood that these structural components operate independent of another and thus a given rack system may incorporate less than all these features to account for an unleveled floor. Also, it is understood that the rack system may include other features not specifically described herein to provide additional rack stability such as load distribution sensors, tip rails, and the like.

Many changes and will modifications could be made to the invention without departing from the spirit thereof. The scope of these changes will become apparent from the appended claims.

We claim:

1. A mobile rack system comprising:
   a first rack mounted to and extending above a first mobile carriage for movement on a floor;
   a second rack mounted to and extending above a second mobile carriage for movement on the floor, wherein the first and second mobile carriages each include wheel structure engaging the floor and supporting the first rack and the second racks for rolling movement on and along the floor;
   a carriage spacer interconnecting the first mobile carriage and the second mobile carriage such that the first mobile carriage and the second mobile carriage move together along, the floor, wherein the carriage spacer allows the carriages to move vertically relative to one another when the first and second racks are translated along the floor; and
   a flue spacer having interfitting members adjustably interconnecting the first rack and the second rack independent from the connection between the first and second mobile carriages, and enabling the first rack and the second rack to move in both a lateral direction and a vertical direction relative to another when the wheel structure of the mobile carriages move on and along portions of the floor that are not level.

2. The mobile rack system of claim 1 wherein each mobile carriage includes at least a pair of wheels adapted to ride along a rail mounted to the floor.

3. The mobile rack system of claim 2 wherein each wheel has a tread pattern and a contour matched to that of the rail.

4. The mobile rack system of claim 3 wherein the tread pattern includes a pair of flanges spaced to form a channel therebetween.

5. The mobile rack system of claim 2 further comprising a motor associated with each of the mobile carriages that drives at least one of the wheels and a motor controller that controls operation of the motor.

6. The mobile industrial rack system of claim 5 further comprising a synchronous motor control and wherein the motor controller of each of the mobile carriages provides feedback regarding operation of the motor to the synchronous motor control which in turn controls the motor controller based on the feedback.

7. The mobile rack system of claim 1 wherein the carriage spacer is further adapted to allow the first and second mobile carriages to move vertically independently of one another when the carriages are translated along the rail over portions of the floor that are not level, and includes a pivot pin against which the carriages move relative to another when the carriages move along the floor.

8. A mobile rack system comprising:
   a series of rails mounted directly on a floor and arranged parallel to and spaced from One another along the floor;
   a first rack and a second rack;
   a first mobile carriage supporting the first rack for rolling movement on and along the floor-mounted rails, the first rack including a first motor operative to translate the first rack on and along the series of floor-mounted rails and a first motor controller that provides a first encoder count;
   a second mobile carriage supporting the second rack for rolling movement on and along the floor-mounted rails, the second rack including a second motor operative to translate the second rack on and along the series of floor-mounted rails and a second motor controller that provides a second encoder count;
   a flue spacer having interfitting members adjustably interconnecting the first rack and the second rack to enable the first rack and the second rack to move relative to each other when the wheel structure of the mobile carriage moves on and along portions of the floor that are not level;
   a carriage spacer movably interconnecting the first mobile carriage and the second mobile carriage to allow the first and second mobile carriages to move vertically relative to one another when the first and second mobile carriages move along portions of the floor that are not level; and
   a synchronous motor control communicatively linked with the first and second motor controller to receive the first and second encoder counts to synchronize the operating, speed of the first and second motors.

9. The rack system of claim 8 wherein each carriage includes a wheel mounted to a shaft that is caused to be rotated by one of the first and second motors and an encoder that counts rotations of the shaft.

10. The rack system of claim 8 wherein the flue spacer allows the first, rack and the second rack to move in at least two directions including a lateral direction and a vertical direction.

* * * * *

UNITED STATES PATENT AND TRADEMARK OFFICE
CERTIFICATE OF CORRECTION

PATENT NO. : 8,960,455 B2  
APPLICATION NO. : 13/848101  
DATED : February 24, 2015  
INVENTOR(S) : Matthew A. Tourdot et al.

Page 1 of 1

It is certified that error appears in the above-identified patent and that said Letters Patent is hereby corrected as shown below:

IN THE CLAIMS:

In claim 1, column 7, line 41, after the word "along" delete ",".

In claim 8, column 8, line 21, delete "One" and substitute therefore "one".
In claim 8, column 8, line 49, after the word "operating" delete ",".

In claim 10, column 8, line 56, after the word "first" delete ",".

Signed and Sealed this  
Ninth Day of June, 2015

Michelle K. Lee  
*Director of the United States Patent and Trademark Office*